US010443803B2

(12) United States Patent
Edletzberger et al.

(10) Patent No.: US 10,443,803 B2
(45) Date of Patent: Oct. 15, 2019

(54) LIGHTING DEVICE WITH LIGHTGUIDE ASSEMBLY WHICH CAN BE LOCKED THEREIN

(71) Applicant: ZKW Group GmbH, Wieselburg An der Erlauf (AT)

(72) Inventors: Thomas Edletzberger, Loosdorf (AT); Patrick Windgruber, Gaming (AT); Stefan Etlinger, Steinakirchen am Forst (AT)

(73) Assignee: ZKW Group GmbH, Wieselburg (AT)

( * ) Notice: Subject to any disclaimer, the term of this patent is extended or adjusted under 35 U.S.C. 154(b) by 135 days.

(21) Appl. No.: 15/510,725

(22) PCT Filed: Aug. 4, 2015

(86) PCT No.: PCT/AT2015/050189
§ 371 (c)(1),
(2) Date: Mar. 13, 2017

(87) PCT Pub. No.: WO2016/040971
PCT Pub. Date: Mar. 24, 2016

(65) Prior Publication Data
US 2017/0261168 A1  Sep. 14, 2017

(30) Foreign Application Priority Data
Sep. 16, 2014 (AT) .................................. 50650/2014

(51) Int. Cl.
*B60Q 1/00* (2006.01)
*B60Q 1/04* (2006.01)
(Continued)

(52) U.S. Cl.
CPC ............ *F21S 41/29* (2018.01); *B60Q 1/0011* (2013.01); *B60Q 1/0052* (2013.01); *B60Q 1/04* (2013.01);
(Continued)

(58) Field of Classification Search
CPC ...... F21S 41/24; G02B 6/0006; B60Q 1/0011; B60Q 1/04
See application file for complete search history.

(56) References Cited

U.S. PATENT DOCUMENTS 5,803,575 A * 9/1998 Ansems ............... G02B 6/0006
362/554
2008/0089089 A1 * 4/2008 Hama .................. A61B 1/0653
362/574

(Continued)

FOREIGN PATENT DOCUMENTS

CN 201575384 U 9/2010
CN 202691847 U 1/2013
(Continued)

OTHER PUBLICATIONS

Office Action issued in Austrian application No. A 50650/2014, completed Jul. 9, 2015.
(Continued)

*Primary Examiner* — Alexander K Garlen
*Assistant Examiner* — Eric T Eide
(74) *Attorney, Agent, or Firm* — Eversheds Sutherland (US) LLP

(57) ABSTRACT

In a lighting device for a vehicle, a light guide assembly (10) for guiding the light emitted by a light source comprises a head portion (12) with decoupling elements (18) for decoupling at least some of the coupled-in light, and also a feed line portion (11), which comprises a coupling-in region (15) for the coupling-in of light from a light source and by means of which light coupled in in this way is fed to the head portion (12). The coupling-in region (15) has a first securing arrangement (13) with at least one element protruding transversely to the longitudinal axis of the coupling-in region (15), for example a pin, by means of which the coupling-in region (15) is insertable into a first securing
(Continued)

location in the lighting device and lockable there. The head portion (12) has a second securing arrangement (14) for securing the head portion (12) in the lighting device.

13 Claims, 12 Drawing Sheets

(51) Int. Cl.
| | |
|---|---|
| *F21V 8/00* | (2006.01) |
| *F21S 41/29* | (2018.01) |
| *F21S 43/241* | (2018.01) |
| *F21S 41/24* | (2018.01) |
| *F21S 43/237* | (2018.01) |
| *F21S 43/245* | (2018.01) |
| *F21S 43/247* | (2018.01) |
| *F21S 43/27* | (2018.01) |
| *F21S 43/251* | (2018.01) |

(52) U.S. Cl.
CPC ............ *F21S 41/24* (2018.01); *F21S 43/237* (2018.01); *F21S 43/241* (2018.01); *F21S 43/245* (2018.01); *F21S 43/247* (2018.01); *F21S 43/251* (2018.01); *F21S 43/27* (2018.01); *G02B 6/0006* (2013.01)

(56) References Cited

U.S. PATENT DOCUMENTS

| | | |
|---|---|---|
| 2009/0016074 A1 | 1/2009 | Dolson et al. |
| 2014/0168940 A1* | 6/2014 | Shiomi ............... B60Q 1/0023 362/84 |
| 2014/0347874 A1* | 11/2014 | Nakaya ............... G02B 6/0008 362/510 |
| 2015/0362659 A1* | 12/2015 | Nishihata ............ G02B 6/0038 362/511 |
| 2016/0146415 A1* | 5/2016 | Suzuki ................ G02B 6/0006 362/553 |

FOREIGN PATENT DOCUMENTS

| | | |
|---|---|---|
| CN | 203082754 U | 7/2013 |
| CN | 203771297 U | 8/2014 |
| DE | 202006003392 U1 | 5/2006 |
| DE | 10040302 B4 | 4/2007 |
| DE | 102009004296 A1 | 7/2010 |
| EP | 2071228 A2 | 6/2009 |
| EP | 2479487 A1 | 7/2012 |
| FR | 2965040 A1 | 3/2012 |
| JP | 2005019154 A | 1/2005 |

OTHER PUBLICATIONS

International Preliminary Report on Patentability for PCT/AT2015/050189, dated Sep. 8, 2016.

* cited by examiner

LIGHTING DEVICE WITH LIGHTGUIDE ASSEMBLY WHICH CAN BE LOCKED THEREIN

The invention relates to a lighting device for a vehicle, in particular for a motor vehicle, which device comprises at least one light source and at least one light guide assembly assigned to the at least one light source for guiding the light which is emitted by the at least one light source and coupled into the light guide assembly, wherein the light guide assembly is configured to be mounted in a support frame of the lighting device and comprises:
- a head portion (in particular what is known as a light ring) having one or (preferably) more decoupling elements for coupling out at least some of the coupled-in light, and
- a feed line portion, which comprises a coupling-in region, which is designed to couple in light originating from a light source along a coupling-in direction and which is configured to direct light, which is thus coupled in, to the head portion.

A lighting device of this type is for example a headlamp, such as that of a motor vehicle. Lighting devices of this type are known for example from DE 100 40 302 B4, which describes a headlamp in which light is guided from a light source via a light guide, which has an end portion similar to a light ring, and is emitted from the latter for lighting purposes; the light guide is held in a holder by sleeves. A disadvantage is the use of separate component parts, such as the sleeves.

The light guide is secured in conventional assemblies by screw connections or clamping with use of additional component parts. This leads to a significant effort with regard to the securing of the light guide and centring in the desired position. In addition, additional cover parts are necessary here in order to achieve the necessary shielding of the light guide, which conceals said light guide externally.

The object of the invention is therefore to create a simplified securing of a light guide assembly in a lighting device, in particular such as a motor vehicle headlamp, which enables a fixing of the light guide both in terms of the coupling-in location of the light and the decoupling elements for radiation using simple means, yet still in a reliable manner.

This object is achieved by a light guide assembly or a lighting device of the type described in the introduction, in that, in accordance with the invention, the coupling-in region has a first securing arrangement, which comprises at least one locking element protruding transversely to a longitudinal axis of the coupling-in region, and the head portion has a second securing arrangement for securing the head portion at a second securing location of the support frame. The coupling-in region thus can be inserted into a first securing location of the support frame (for example in a corresponding opening, which is provided in the first securing location) and can be locked therein by means of the first securing arrangement.

As a result of this solution, a reliable locking and centring system for the light guide assembly on the support frame of the lighting device (i.e. in the headlamp) is provided, which ensures an accurate positioning in relation to the support frame and thus the light source. At the same time, the insertion of the coupling-in region into the first securing location in the support frame leads to a shielding of the light feed externally. In addition, a simpler and quicker assembly of the light guide component parts is achieved, as well as a saving of additional securing components, such as screws and/or clips. The coupling-in region is, therefore, fixed preferably in the first securing location without the use of additional components.

A facilitated and yet reliable and secure assembly is also provided by a development in accordance with which the light guide assembly is movable in the first securing location about or transversely to the longitudinal axis, specifically is pivotable thereabout or displaceable transversely thereto, in a state in which the coupling-in region is inserted in the first securing location, but the head portion is not yet fixed at the second securing location.

A reduction of the number of components and a resultant simplification of the assembly may be achieved also by having the locking element(s) being integral with the coupling-in region.

In an advantageous embodiment the locking element may be formed in such a way that it is provided by a protruding lug on the coupling-in region, which lug forms a stop face on a side facing away from a light coupling-in face of the coupling-in region. This stop face can cooperate in particular with a corresponding face of the securing location so as to prevent any movement out of the securing location in any direction, in the inserted state.

The coupling-in region in an advantageous embodiment may comprise two locking elements, which are preferably offset along the longitudinal axis. The two locking elements may preferably be arranged in different angular positions. The two locking elements have stop faces, which preferably face one another. The stop faces correspond to counter-faces on the housing, which are formed in a preferred embodiment as an upper side and underside of a common housing rib (strip); in a variant, each counter-face could also lie on different strips. The arrangement of the locking elements in various angular positions has the advantage that, following insertion of the first locking element, the second locking element contacts the upper counter-face of the housing strip and thus mechanically fixes the plane of rotation of the locking movement.

Alternatively, the stop faces may face away from one another. They may be disposed in this embodiment on different locking elements or on the same locking element. The associated counter-faces are disposed in this case preferably on different housing ribs (or strips). Both embodiments prevent a movement from the securing location, both in the insertion direction and in the opposite direction.

A simplified assembly of the light guide assembly is also facilitated inter alia by an embodiment in which the coupling-in region is formed as a substantially circular-cylindrical end of a light guide, at which light is coupled in through the front face of the circular-cylindrical end as a light coupling-in face.

This allows the assembly of a circular light guide by insertion and pivoting about the insertion direction and enables an interlocked connection of light guide and housing. Because the housing is manufactured from optically non-transparent material, and thus in particular the securing location is impermeable to light, elements of the headlamp such as reflectors or mirrored panels are shielded against scattered light by the coupling-in region. In particular, this concerns light which on account of the greater exit angle from the light source enters the coupling-in face outside the total reflection angle of the light guide and is not forwarded on in the light guide.

In an embodiment that is likewise expedient, the second securing arrangement may comprise at least one latching element, specifically a latching pawl or a latching stop, which cooperates with an assigned counter-element of the second securing location, specifically a latching stop or a latching pawl.

The invention inclusive of all preferences and developments will be explained in greater detail hereinafter on the basis of a non-limiting exemplary embodiment, which is illustrated in the accompanying drawings. The drawings show FIG. 1 a light guide according to the exemplary embodiment of the invention in an oblique view;

FIG. 2 the coupling-in region of the light guide of FIG. 1 in a side view;

FIG. 3 the coupling-in region in another side view;

FIG. 4 the coupling-in region when the light guide is assembled in a support frame of a headlamp;

FIG. 5 a view from below of the securing location of the light guide in the support frame;

FIG. 6 a side view of the securing location of the light guide in the support frame;

FIG. 7 the light guide of FIG. 1 in the assembled state, in which this is inserted in the support frame together with the a second light guide;

FIG. 8 a detailed view of the securing arrangement of the light ring in the assembled state in the corresponding securing location;

The exemplary embodiment of the invention described hereinafter presents the lockable arrangement of two light guides in a headlamp for a motor vehicle (such as a passenger car). It should be noted that the invention is not limited to the exemplary embodiment and that variants, modifications and additions to the exemplary embodiment which are obvious to a person skilled in the art and which fall under the scope of protection according to the claims are additionally possible.

Figure 1:
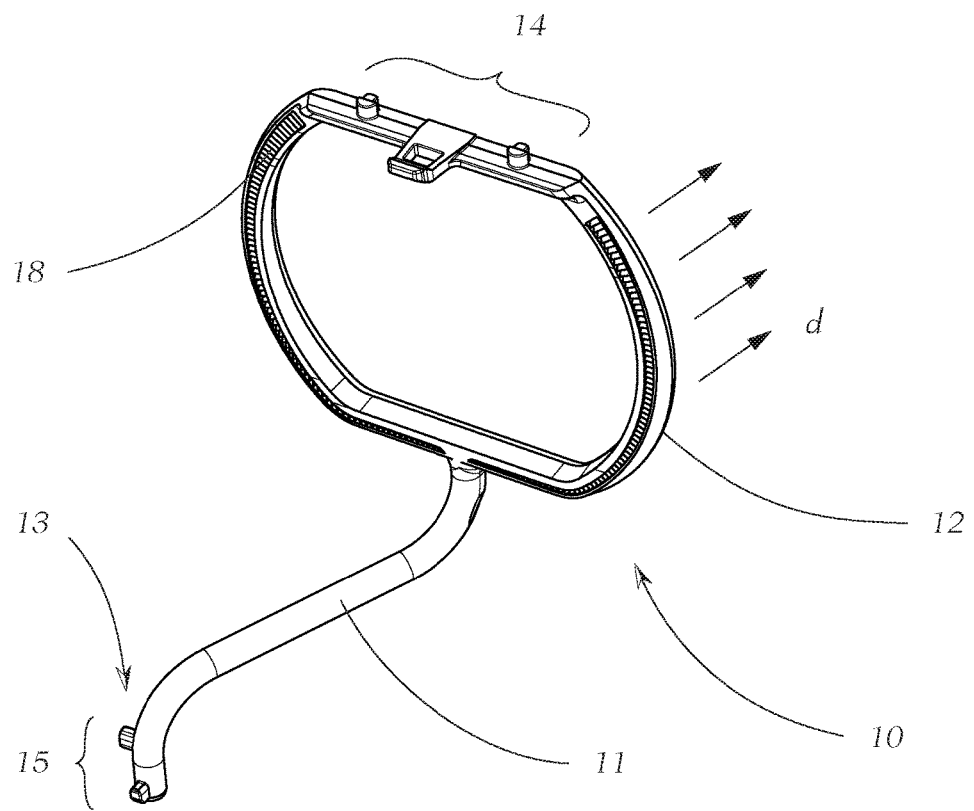

FIG. 1 shows a light guide assembly 10 of the exemplary embodiment in a perspective view. The light guide assembly 10 will be referred to hereinafter simply as a light guide. The light guide 10, which in the known manner consists of a suitable light guide material and is substantially rigid, is divided into a feed line portion 11 and a head portion 12. The feed line portion 11, also referred to as a "feed line" for short, is preferably shaped in an elongate manner, preferably with a cross-section that is substantially uniform in cross-section; i.e. the feed line has a rod-shaped form, which generally may have straight and curved portions, such as a coupling-in region 15 in the form of a short straight portion as in the shown example, which is followed by two curved knee portions, between which there is again a straight portion. By way of example, the cross-section of the feed line (apart from attached component parts, such as the lugs, which are yet to be discussed) is rounded, preferably circular. The head portion 12 is for example a light ring, which in the assembled state (FIG. 7) runs around the edge of a window-like headlamp opening and along its course has one or preferably more decoupling elements 18, by means of which the light coupled into the light guide can exit towards the front (the radiation direction d is indicated in FIG. 1 by arrows). The shaping of the light ring 12 in respect of the decoupling elements 18 does not form part of the subject matter of the invention and therefore will not be discussed here in greater detail; instead, reference is made in this respect to the prior art. In accordance with the invention both the feed line 11 and the head portion (light ring) 12 each include securing arrangements 13, 14, by means of which it is possible to secure the light guide 10 in a headlamp 20 (FIG. 7) and lock it there in a desired assembly position.

Figure 7:
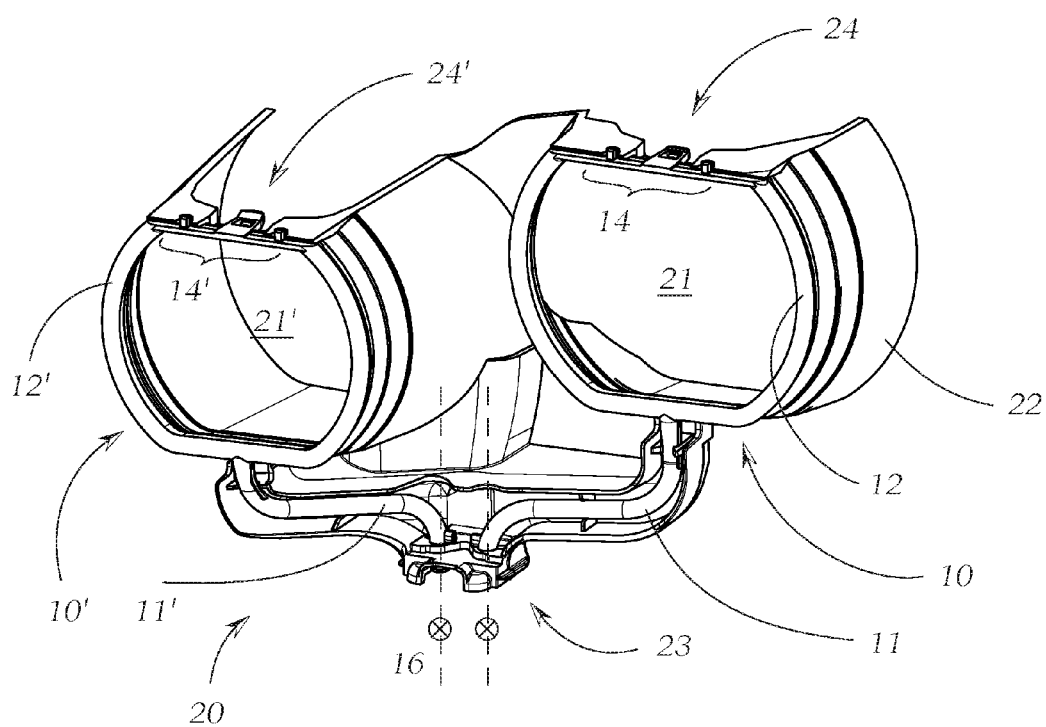

As can be seen in FIG. 7, the light guide assembly 10 of the shown exemplary embodiment constitutes a component of a double headlamp 20, which has two openings 21, 21', which may have different or identical functions; for example, one opening 21 is provided for dipped beam light, and the other opening 21' is provided for full beam light. A separate light guide assembly 10, 10' with in each case a specifically designed light ring 12, 12' is provided for each light window. The second light guide assembly 10' thus preferably has a shaping corresponding to the first light guide assembly 10, but adapted to the second opening 21'. The light guide 10, 10' and also further components (not shown) of the headlamp are assembled in a housing or support frame 22 of the headlamp. The support frame 22 is also referred to as a "screen" due to its task of preventing the visibility of internal parts of the headlamp from outside. FIG. 7 is a perspective illustration of the support frame from the front, i.e. the light radiates substantially towards the viewer. Both light guides 10, 10' are preferably inserted into the support frame 22 of the headlamp in the same process step in accordance with the invention. In FIG. 7 and comparable figures, merely the support frame 22 of the headlamp has been shown for the sake of clarity (in addition to the light guides and components belonging thereto), wherein the covers of the feed lines 11, 11' of the light guides have also been removed in order to make these visible for the purposes of the disclosure. In addition, in FIG. 7 the light sources 16 assigned to the light guides 10, 10' are illustrated merely symbolically. By way of example, the light source may be an LED light source.

Figure 2:
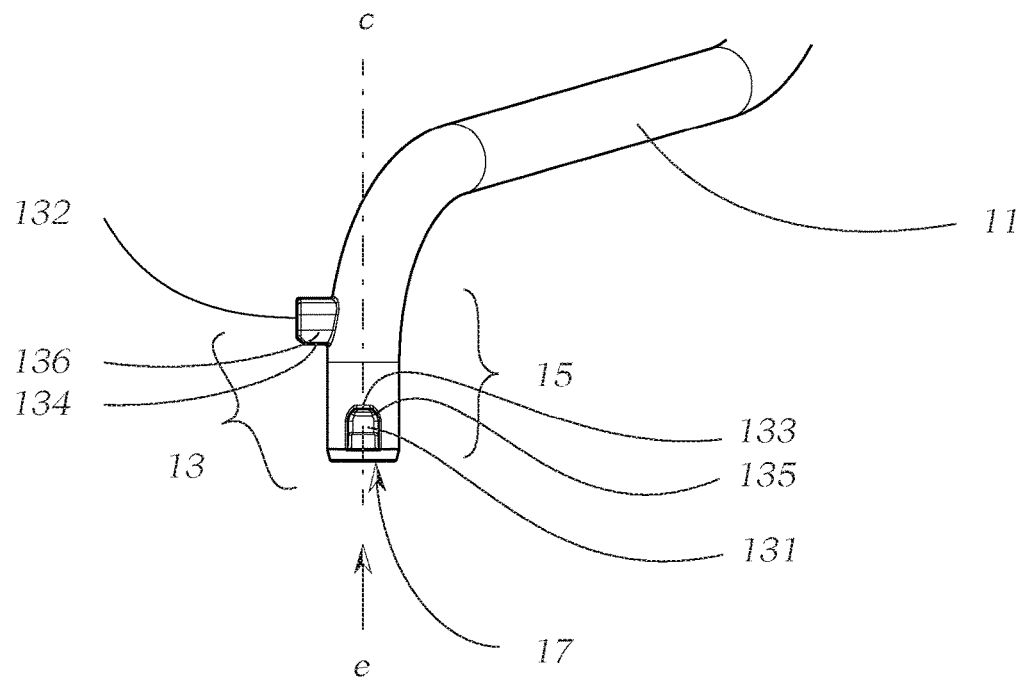
Figure 3:
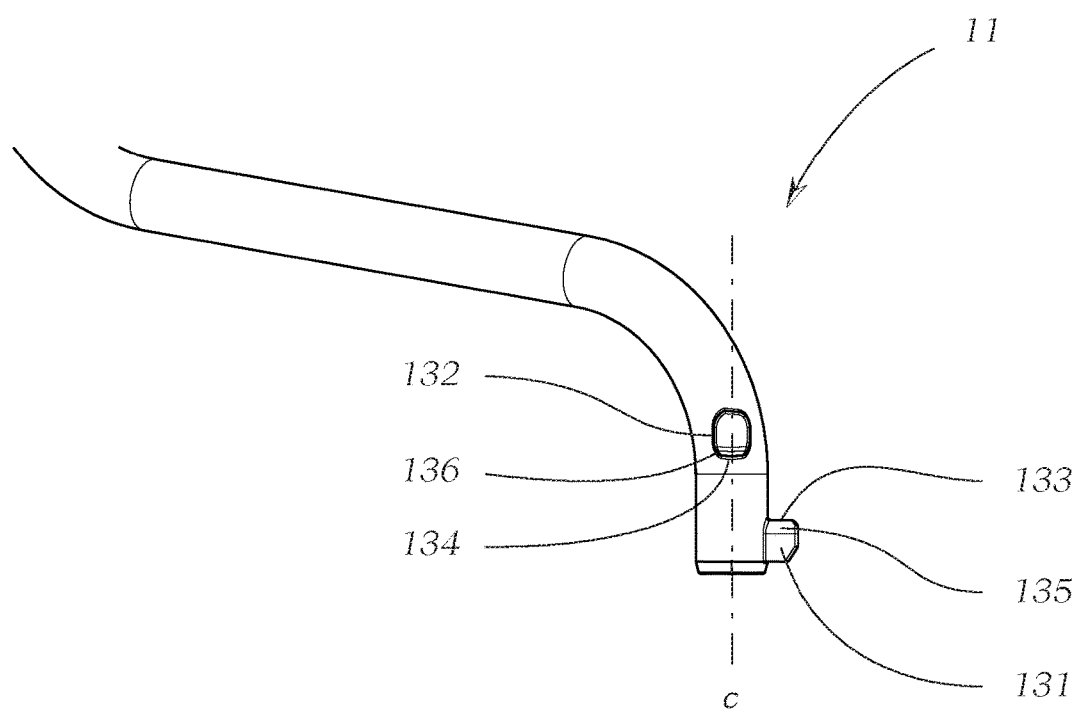

With reference to FIGS. 2 and 3, the feed line 11 at its end distanced from the head portion 12 has the aforementioned coupling-in region 15 for coupling in light from a light source 16 (FIG. 7) along a coupling-in direction e through a coupling-in face 17 provided for this purpose. By way of example, the coupling-in region is formed as an end portion of the feed line 11 and has a cylindrical body with a circular cross-section and longitudinal axis c, wherein the coupling-in face 17 is formed by the front face of the cylindrical body. The coupling-in direction e is generally parallel to the longitudinal axis c.

The coupling-in region 15 in accordance with the invention additionally comprises one or more elements which produce a securing arrangement 13, which allows to fix the coupling-in region 15 in the support frame 22 in a corresponding securing location 23 (FIG. 7). In the shown example the securing arrangement 13 is formed from two pins or lugs 131, 132; of course it may be formed differently in other embodiments, for example with just one pin. The lugs 131, 132 are arranged offset in relation to one another, more specifically preferably at different heights along the longitudinal axis c of the coupling-in region 15 and/or in various angular positions about the axis c.

The locking elements, which are formed here for example as lugs, are bodies protruding transversely to a longitudinal axis of the light guide (here the longitudinal axis c), with at least one of the delimiting faces of said locking elements being used as a contact face 133, 134 (preferably formed as a planar flat part) as described hereinafter. Light guides and elements integrally formed thereon are produced by means of injection moulding. For facilitated assembly, burrs and sharp edges should be avoided. For this purpose, the delimiting faces transition via chamfered areas 135, 136 into the cylindrical body of the coupling-in region.

Figure 4:
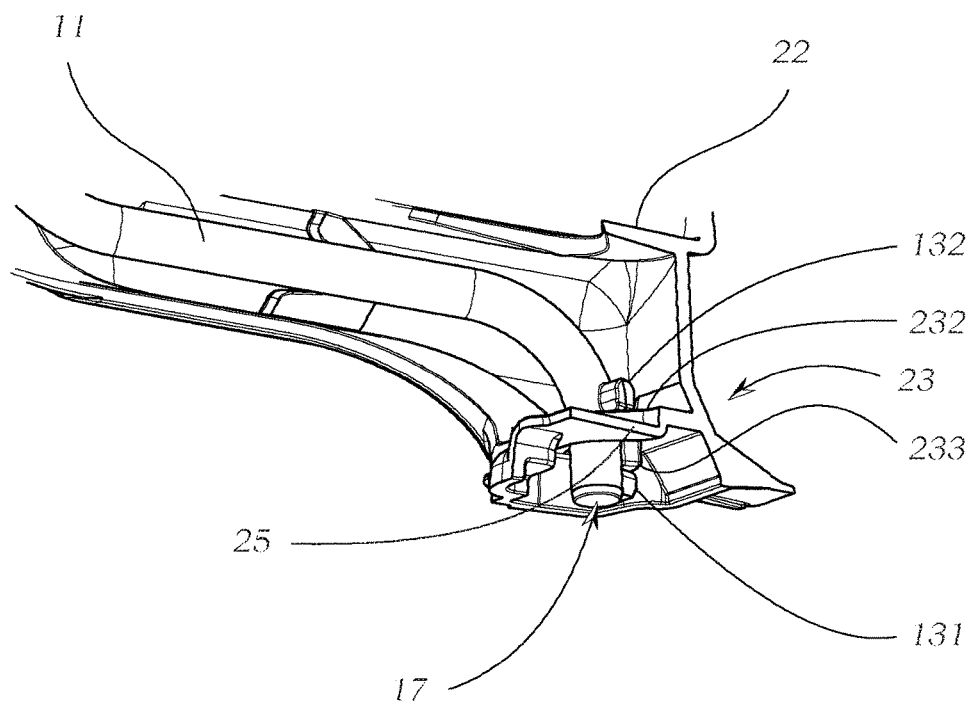
Figure 5:
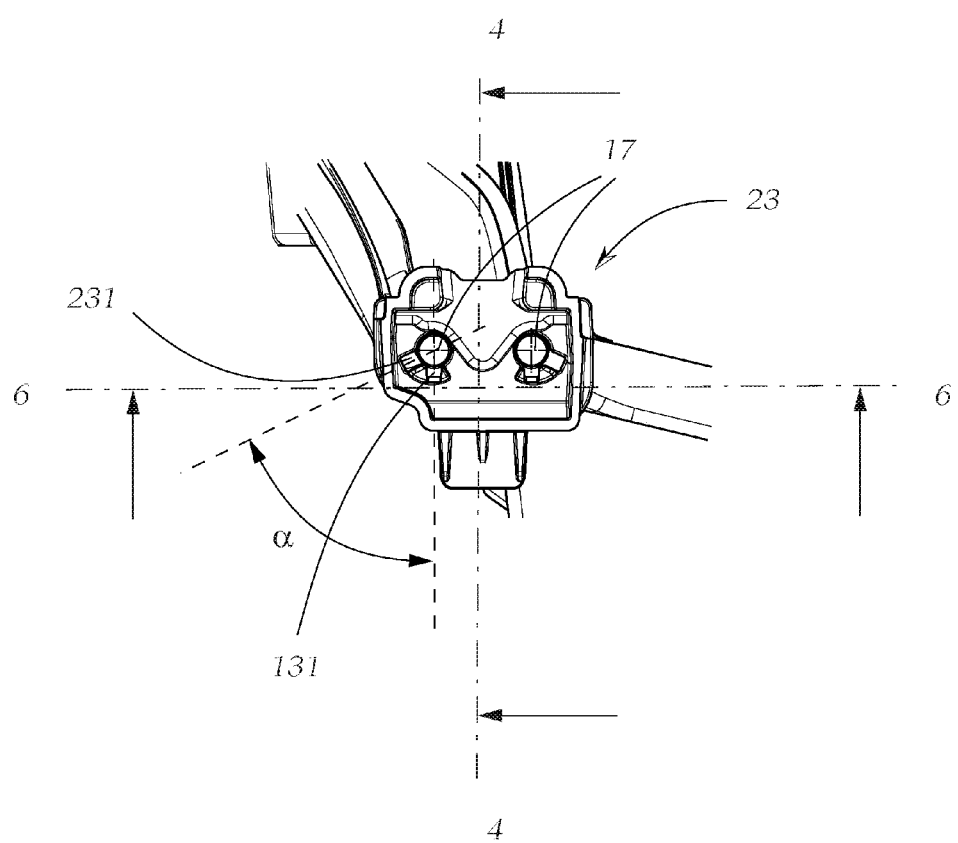

FIG. 4 shows the region of the support frame 22, in which the securing location 23 is disposed, in a sectional view in accordance with a section along the line 4-4 in FIG. 5; since the sectional plane runs between the two coupling-in regions of the inserted light guides, just one of the two light guides (more specifically the feed line 11 thereof) is visible in FIG. 4. The light guide is illustrated in the assembled state (end position). The lower lug 131 bears against a stop face 233 of the securing location 23; more specifically, the lug 131, on the side facing away from the light coupling-in face 17, has an upper face 133 (see FIGS. 2 and 3), which comes into contact with the stop face 233. The lug 131 thus prevents an undesirable movement of the coupling-in region out of the securing location 23 (i.e. upwardly in FIG. 4), which could hinder or completely prevent the coupling of the light into the light guides. The upper lug 132 by contrast has a lower face 134, which constitutes a stop in the other direction, so as to prevent an excessive displacement/pressing of the light coupling-in face 17 towards the light source. The area 134 bears for this purpose on a counter-face 232 of the securing location 23, which for example is formed by the upper side of the frame strip 25 through which the coupling-in region is inserted.

Figure 6:
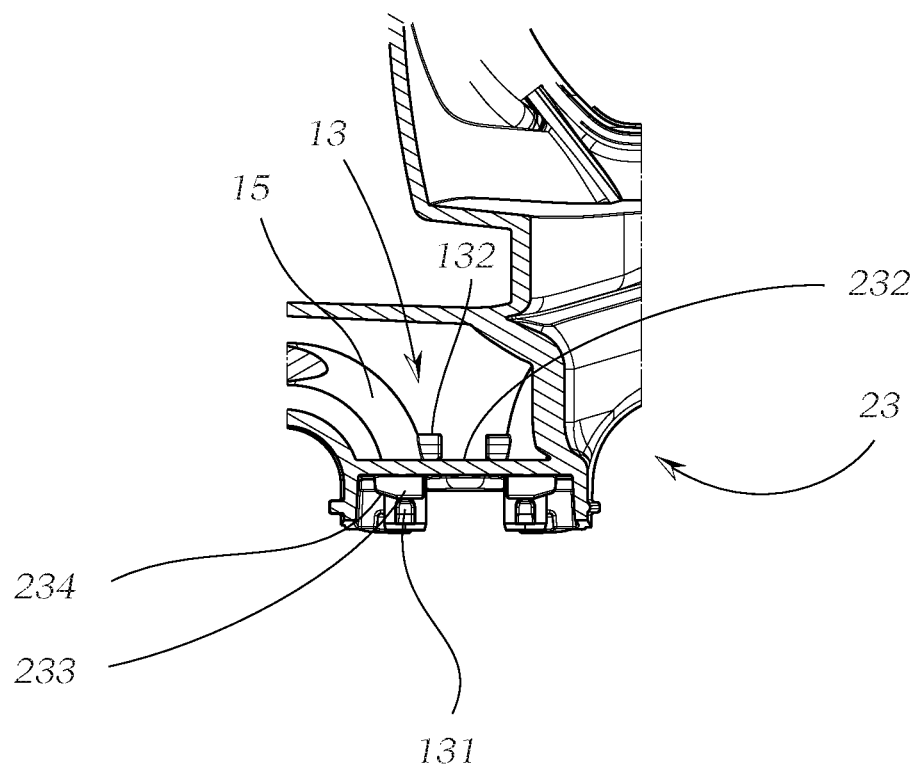

FIG. 5 shows the securing location 23 in a view from below, in which the ends of both inserted light guides and thus the light coupling-in faces 17 are visible. FIG. 6 shows the securing location 23 in a lateral sectional view corresponding to the line of section 6-6 of FIG. 5. In the example of the first securing arrangement 13 of the first light guide 10, the lower lug 131 is visible as well as a recess 231, which is arranged relative to the end position of the lug 131 by a predetermined angle α. The recess 231 serves to enable an insertion of the coupling-in region 15, wherein this is rotated through the angle α about the longitudinal axis. The design of the stop face 233 is also visible in FIG. 6; this is provided with a ramp-like chamfer 234 in order to facilitate the fitting of the lug 131 against the stop face 233 in the event of the final rotary movement.

Referring again to FIGS. 1 and 7, a second securing arrangement 14 is provided on the head portion 12 of the light guide 10 and cooperates with a securing location 24 of the support frame, which is provided at the edge of the assigned opening 21. The resultant securing serves advantageously to mount the light ring 12 in the correct position at the edging of the opening 21.

Figure 8:
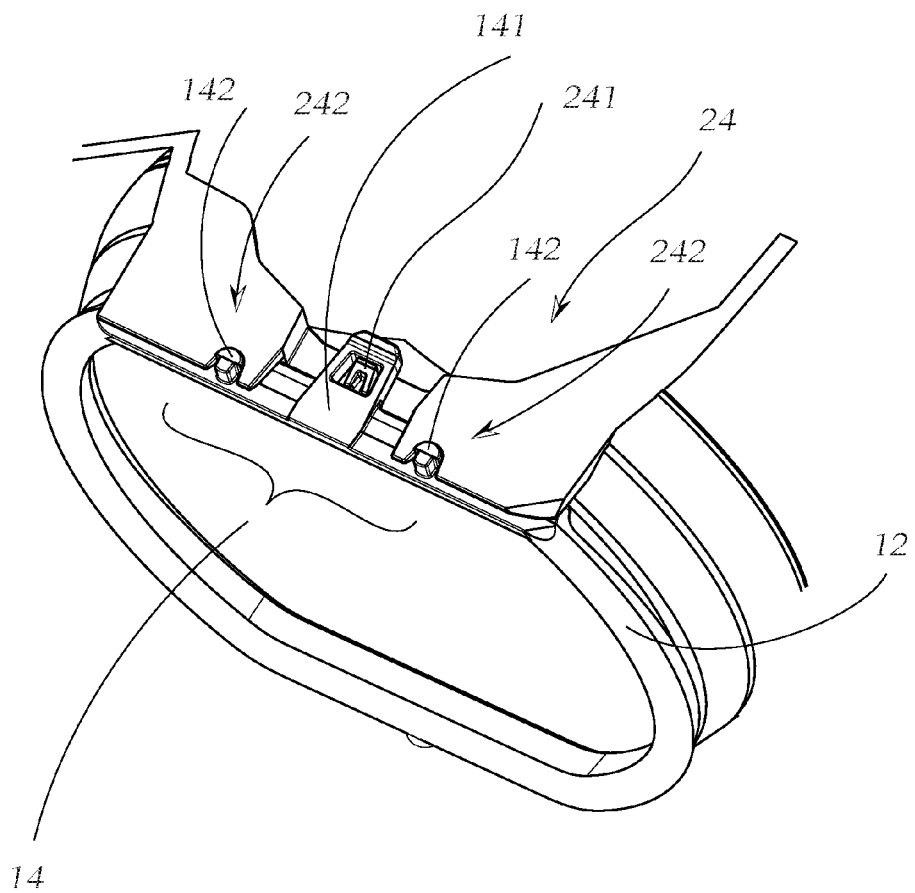

FIG. 8 shows the second securing arrangement 14 in the inserted state in the assigned securing location 24 in an oblique view from above. The securing arrangement 14 comprises a latching element 141, here a latching stop for example in the form of a frame, which cooperates with a corresponding counter-element 241, which is formed here as a resilient pawl 241, which is formed on a face of the securing location 24 that for example is oriented upwardly. Of course, in a variant, both elements, which ensure a latching, may also be formed differently; in particular, the pawl and the latching stop for the pawl could be swapped with each other. In addition, arrangements for centring the light ring 12 may be provided favourably. By way of example, two wedge-like indentations 242 are provided in the securing location 14 on either side of the pawl 241, and corresponding centring pins 142 of the light ring 12 come to lie in said indentations and produce a centring of the light ring 12 in the desired position on the support frame 22 about the opening 21. Here as well, the centring arrangements may be formed differently in a variant; for example the centring indentations could be formed on the light ring and could cooperate with centring pins on the securing location.

The second light guide 10' allows to be secured accordingly by a separate securing arrangement 14' to a securing location 24' of the support frame 22.

Figure 9:
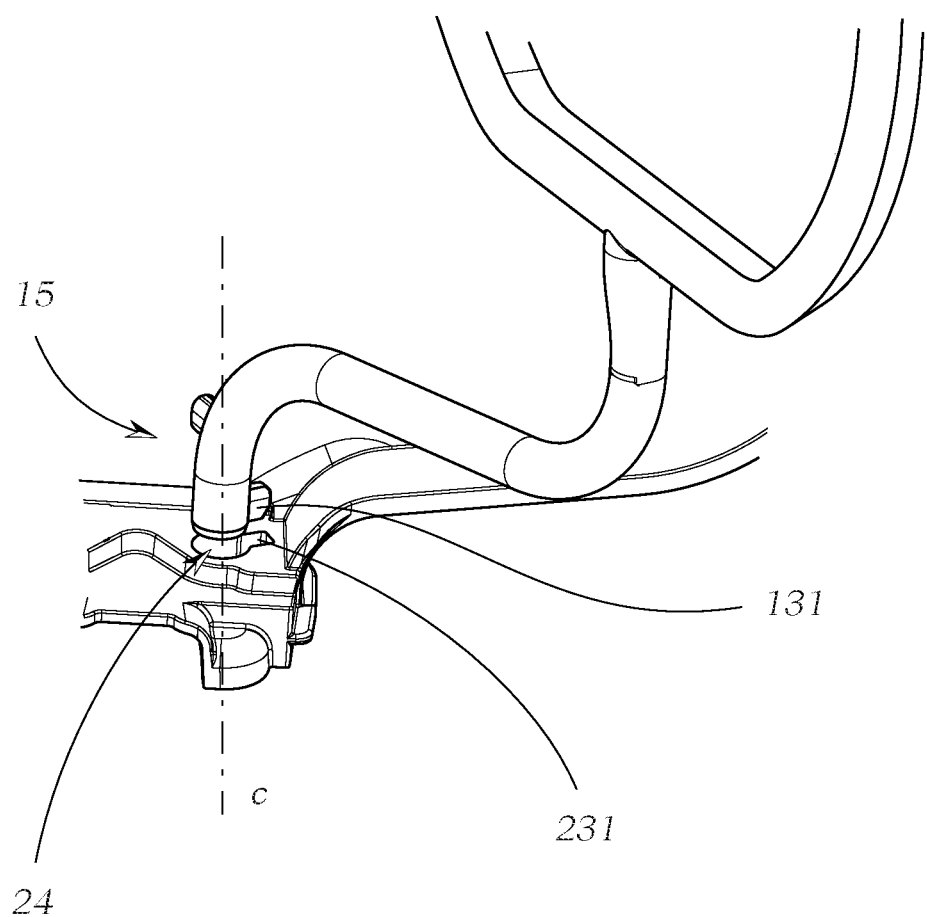
FIG. 9 illustrates the insertion of the coupling-in region of the light guide into the associated securing location.
Figure 10:
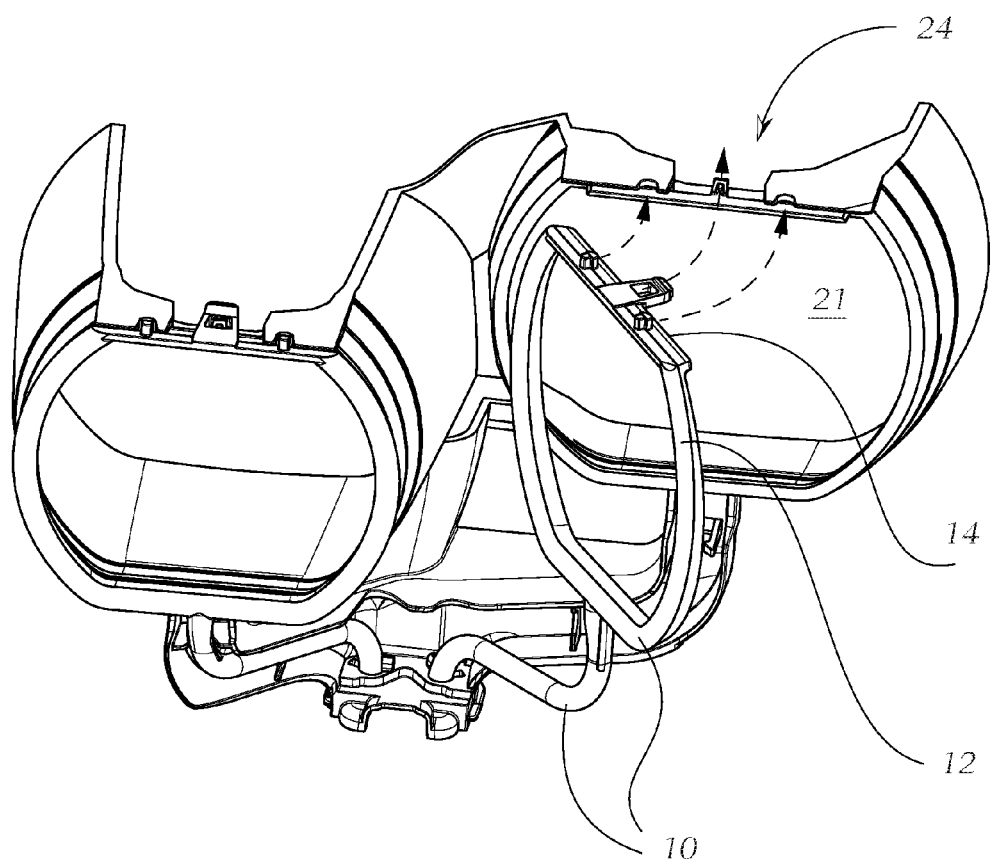
FIG. 10 illustrates the subsequent movement of the light guide into its assembled position.
Figure 11:
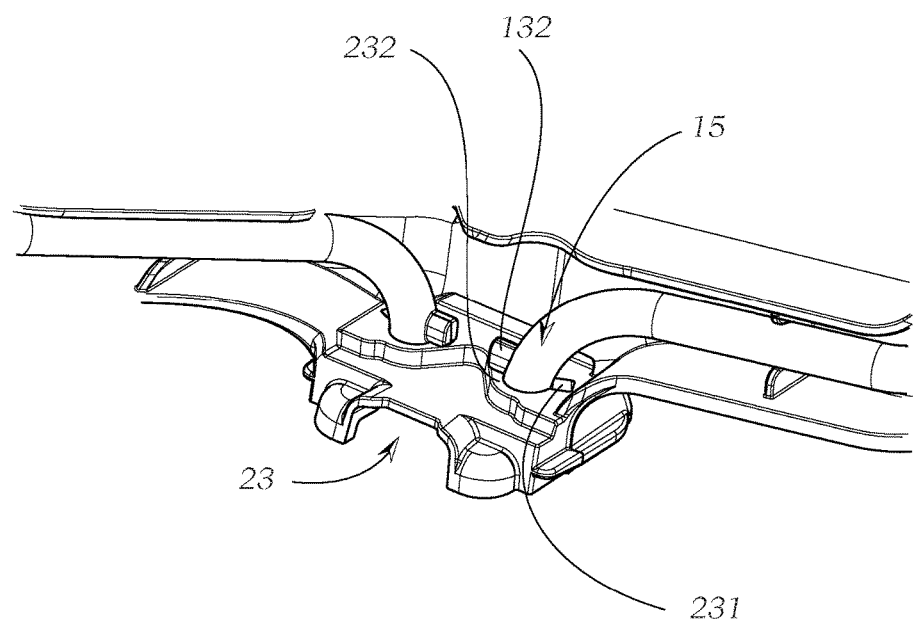
FIG. 11 shows the positioning of the coupling-in regions of both light guides in the assembled position.

FIGS. 9 to 11 illustrate the assembly process of a light guide assembly 10 according to the invention.

As illustrated in FIG. 9, the light guide 10 is inserted into the securing location 24 in a position ("insertion position") that is rotated through an angle α compared to the end position of said light guide by means of a movement along the longitudinal axis c, which preferably coincides with the light coupling-in arrangement e. Here, the end of the light guide forming the coupling-in region 15 is introduced into the opening in the securing location 24 such that it is possible to guide the lug 131 through the recess 231 of the securing location 24 until the second lug 132 contacts the counter-face 232 as a stop. The light guide 10 is movable, more specifically pivotable, about the longitudinal axis c in the state thus reached in the first securing location 23 (i.e. the coupling-in region 15 is inserted in the first securing location).

As illustrated in FIG. 10, the head portion 12 is then moved relative to the opening 21 by means of a pivoting motion, such that the second securing arrangement 14 comes to lie in the second securing location 24 and latches in place there. In this way, the light guide 10 is fixed in its end position. The latched connection of the securing arrangement 14 at the securing location 24 is produced as explained above with reference to FIG. 8 preferably by latching the pawl 241 into the latching stop 141.

FIG. 11 shows, for the end position thus achieved, a detailed view of the first securing location 23 with coupling-in region 15 inserted therein. The strip forming the counter-face 232 for the upper lug 132 is disposed in a clamped position between the upper lug 132 and the lower lug 131 (FIG. 6). A removal of the coupling-in region 15 is not possible, since the lower lug 131 is displaced in relation to the recess 231 by the angle α. In this way, a secure locking of the entire light guide in the position desired as the end position is provided in accordance with the principle of a bayonet closure.

Due to the combination of two securing devices, on the one hand in the region of the coupling-in of light at the feed line 11 and on the other hand at a suitable position on the light ring 12, the invention provides an improved stability of the assembly of the light guide assembly 10 on the support frame 22 of the headlamp. Due to the securing arrangement 13 at the coupling-in region 15, a secure positioning is provided, for example as a result of a clamping by the two lugs 131, 132 and also a connection which in addition is insensitive to vibrations. An accurate positioning of the light ring 12 on the support fame 22 is provided by the latching, without having to accept a resultant impairment of the optimal positioning of the coupling of light in the coupling-in region 15.

Of course, the invention is not limited to the shown exemplary embodiments. Rather, a wide range of modifications and additions may be made without departing from the scope of protection according to the accompanying claims. By way of example, the coupling-in region may contain merely one locking element, which has stop faces arranged opposite one another, whereas two counter-faces are provided in the first securing location and are each formed on a strip of the support frame (these two strips thus form a compartment in which the locking element engages) and cooperate with the stop faces of the locking elements.

Another variant of the invention provides that the light guide assembly is inserted in the first securing location and is displaced (shifted) there transversely to the longitudinal axis, instead of a pivoting motion. This is illustrated in the exemplary embodiment shown in FIGS. 12 to 14.

Figure 12:
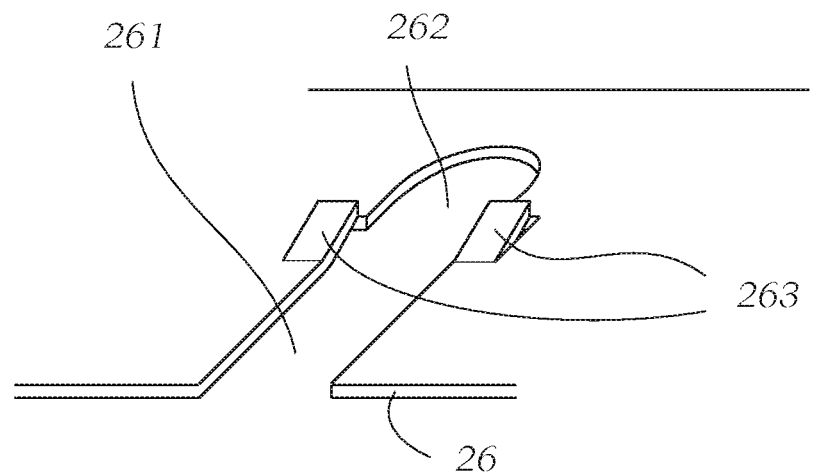
FIG. 12 shows, in a perspective view, a securing location in accordance with another exemplary embodiment, wherein the light guide is insertable by sliding it into a slotted recess in the form of a slotted guide.
Figure 13:
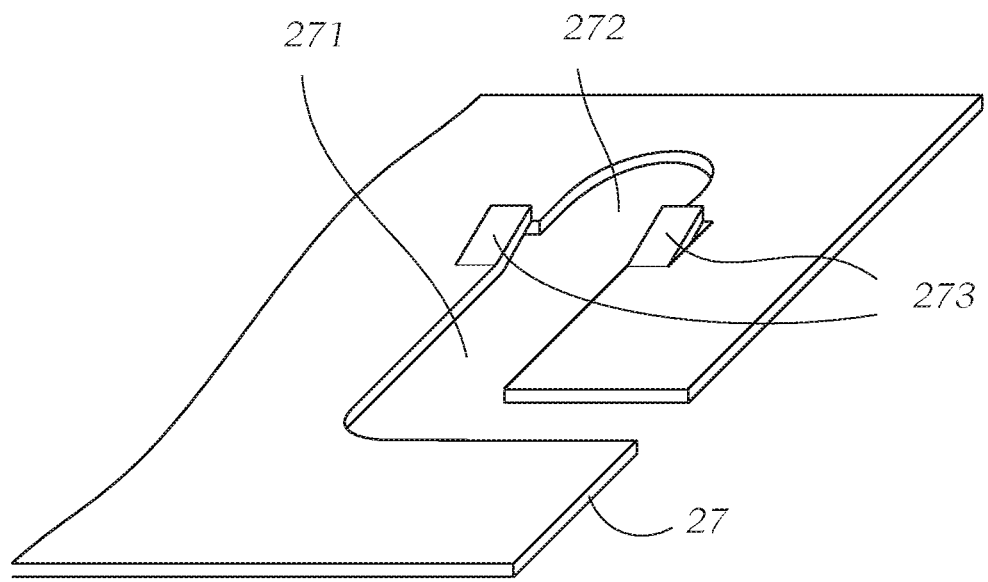
FIG. 13 shows a variant with an angled slotted guide.

FIG. 12 shows a strip 26, which is formed in the first securing location as a modification of the strip 25 with a slotted recess 261. The coupling-in region 15' (FIG. 14) is insertable into this straight-line recess 261 in a lateral movement, specifically transversely to the longitudinal axis c. FIG. 13 shows a variant 27 of the strip, in which the recess 271 is formed as an angled guide similar to a slotted guide, which causes an insertion along paths in different directions. The recess 261, 271, more specifically the end region 262, 272 thereof, preferably runs in the same direction as the direction along which the connection is produced at the second securing location 24.

Figure 14:
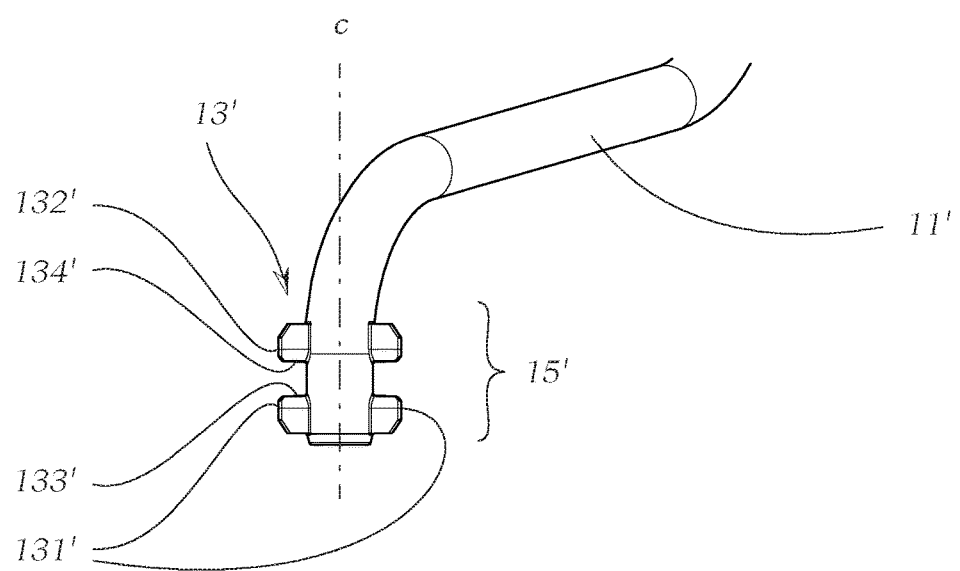
FIG. 14 shows the coupling-in region of a feed line of a light guide which is insertable into a securing location of FIG. 12 or 13.

FIG. 14 shows the coupling-in region 15' in a feed line 11' of a light guide in accordance with this exemplary embodiment. In this case the securing arrangement 13' for example comprises two pairs of lugs 131', 132'. The lugs can each be supported in the end region 262, 272 of the recess on the left and on the right, more specifically with the aid of contact faces 133', 134', which face towards one another and receive the strip therebetween, more specifically the edge of the strip at the recess 261, 271. In order to prevent the coupling-in region 15' from leaving the end region 262, 272 undesirably when inserted into said end region, resilient elements 263, 273 may be provided at the entry of the end region and form stops against a return movement. Alternatively or additionally, the end region may hold the coupling-in region 15' by a clamping effect on account of an accordingly tight shaping.

The invention claimed is:

1. A lighting device (20) for a motor vehicle, wherein the lighting device is configured to be mounted in a support frame (22), the lighting device comprising:
   at least one light source; and
   at least one light guide assembly (10) assigned to the at least one light source for guiding light which is emitted by the at least one light source and coupled into the at least one light guide assembly,
   wherein the at least one light guide assembly (10) is configured to be mounted in the support frame (22) of the lighting device (20) and comprises
   a head portion (12) having at least one decoupling element (18) for coupling out at least some of the light coupled into the at least one light guide assembly, and
   a feed line portion (11) comprising a coupling-in region (15) configured to couple in light originating from the at least one light source and which is configured to direct light coupled in to the coupling-in region through at least one curved portion in the feed line portion to the head portion (12),
   wherein the coupling-in region (15) has a first securing arrangement (13) comprising at least one locking element (131, 132) protruding transversely to a longitudinal axis (c) of the coupling-in region (15), and
   wherein the coupling-in region (15) is insertable into a first securing location (23) of the support frame (22) and is lockable therein by the first securing arrangement,
   wherein the head portion (12) has a second securing arrangement (14) for securing the head portion (12) to a second securing location (24) of the support frame (22), and
   wherein the light guide assembly (10) is pivotable in the first securing location (23, 26, 27) about the longitudinal axis (c) in a state in which the coupling-in region (15, 15') is inserted in the first securing location (23, 26, 27), but the head portion (12) is not fixed at the second securing location (24), where a pivoting motion swings the least one curved portion about the longitudinal axis (c).

2. The lighting device (20) of claim 1, wherein the at least one locking element (131, 132) is formed integrally with the coupling-in region (15).

3. The lighting device (20) of claim 1, wherein the at least one locking element (131) is a protruding lug on the coupling-in region (15), wherein the protruding lug forms a stop face (133) on a side facing away from a light coupling-in face (17) of the coupling-in region (15).

4. The lighting device (20) of claim 1, wherein the at least one locking element comprises two locking elements (131, 132), which are offset along the longitudinal axis (c) and which are arranged in different angular positions.

5. The lighting device (20) of claim 4, wherein each of the two locking elements (131, 132) has a stop face (133, 134), wherein the stop faces are oriented opposite one another and face towards one another, and wherein counter-faces (232, 233) cooperating with the stop faces of the locking elements are provided in the first securing location (23).

6. The lighting device (20) of claim 5, wherein the counter-faces (232, 233) are formed as upper-side and lower-side faces of at least one strip (25) of the support frame (22).

7. The lighting device (20) of claim 5, wherein the coupling-in region has the two locking elements with stop faces arranged opposite one another, and wherein the two counter-faces are provided in the first securing location and are each formed on a strip of the support frame and cooperate with the stop faces of the two locking elements.

8. The lighting device (20) of claim 1, wherein the coupling-in region (15) is formed as a substantially cylindrical end of a light guide, and wherein light is coupled in to the light guide through a front face (17) of the substantially cylindrical end of the light guide.

9. The lighting device (20) of claim 1, wherein the second securing arrangement (14) comprises at least one latching element (141) comprising a latching pawl or a latching stop, either of which cooperates in a latching manner with an assigned counter-element (241) of the second securing location (24) comprising a respective latching stop or a latching pawl.

10. The lighting device (20) of claim 9, wherein the second securing arrangement (14) comprises at least one centring arrangement (142), which cooperates with corresponding indentations and/or protrusions on the second securing location (24) for centring the head portion (12) in the support frame (22).

11. The lighting device (20) of claim 1, wherein the securing location (13) is impermeable to light and together with the coupling-in region (15) of the light guide assembly (10) inserted in said securing location forms a connection to an interior of the lighting device that is shielded against scattered light.

12. The lighting device of claim 1, wherein the at least one curved portion of the feed line portion is made of a substantially rigid material.

13. The lighting device of claim 12, wherein an entirety of the feed line portion is made of a substantially rigid material.

* * * * *